United States Patent [19]

Chauvin et al.

[11] Patent Number: 4,844,514
[45] Date of Patent: Jul. 4, 1989

[54] ROTARY JOINT DEVICE FOR A CRYOGENIC LIQUID

[75] Inventors: Jean-Michel Chauvin, Marly Le Roi; Jean-Pierre R. F. Chilardi, Montlignon, both of France

[73] Assignee: Entreprise D'Equipments Mecanique et Hydrauliques E.M.H., France

[21] Appl. No.: 812,400

[22] Filed: Dec. 23, 1985

[30] Foreign Application Priority Data

Dec. 31, 1984 [FR] France .................. 84 20119

[51] Int. Cl.[4] .................................... F16L 11/12
[52] U.S. Cl. ...................... 285/47; 285/136; 285/190; 285/276; 285/904; 285/915
[58] Field of Search ............ 285/DIG. 904, 915, 134, 285/136, 190, 276, 47

[56] References Cited

U.S. PATENT DOCUMENTS

| | | | |
|---|---|---|---|
| 3,411,526 | 11/1968 | Schaefer | 285/190 X |
| 3,921,273 | 11/1975 | Kondo et al. | 29/157 |
| 4,018,059 | 4/1977 | Hatch | 285/904 X |
| 4,103,938 | 8/1978 | Lasater et al. | 285/276 X |
| 4,323,268 | 4/1982 | Wilson | 285/190 X |

FOREIGN PATENT DOCUMENTS

| | | |
|---|---|---|
| 2251775 | 6/1975 | France . |
| 2473675 | 7/1981 | France . |
| 2539481 | 7/1984 | France . |
| 870269 | 6/1961 | United Kingdom . |

*Primary Examiner*—Dave W. Arola
*Attorney, Agent, or Firm*—Steinberg & Raskin

[57] ABSTRACT

A device forming a swivel joint for a cryogenic liquid with at least one central duct for the flow of said cryogenic liquid through the joint and comprising at least one annular duct co-axially surrounding said central duct for the return of the cold gas originating from the vaporization of the moving liquid, said annular duct comprising gas inlet and outlet pipes; a stationary portion and a portion mounted in rotating relation to said stationary portion by means of a ball or roller bearing operating at a temperature close to ambient temperature, a double set of sealing gaskets also operating at a temperature close to ambient temperature; and heat insulation of at least the parts of said stationary and movable portions forming said annular duct and contacted by said cold gas, so arranged as to prevent any cooling-down of said sealing gaskets through convection or radiation; the device being applicable in particular to the off-shore transfer of liquefied natural gas.

14 Claims, 1 Drawing Sheet

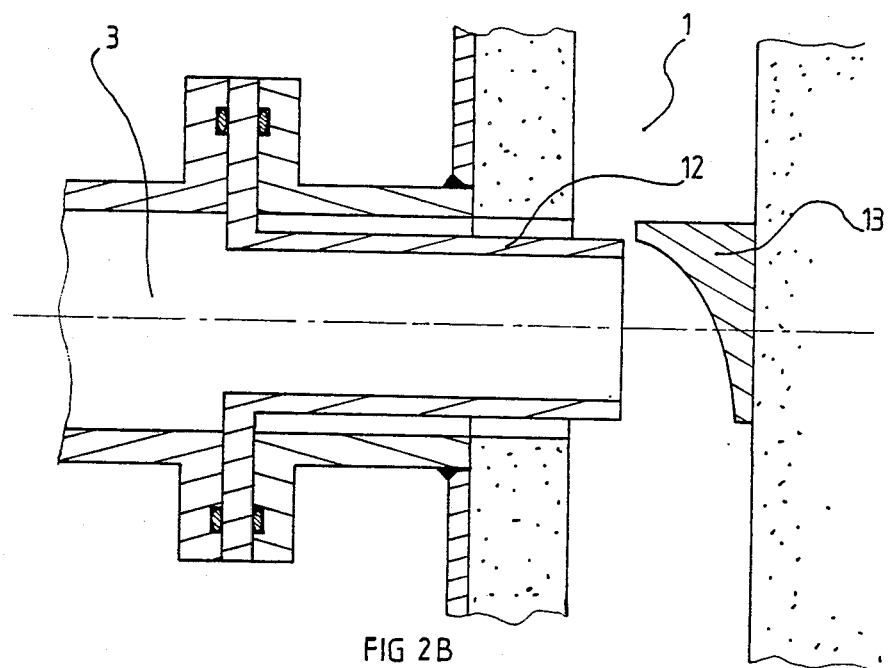
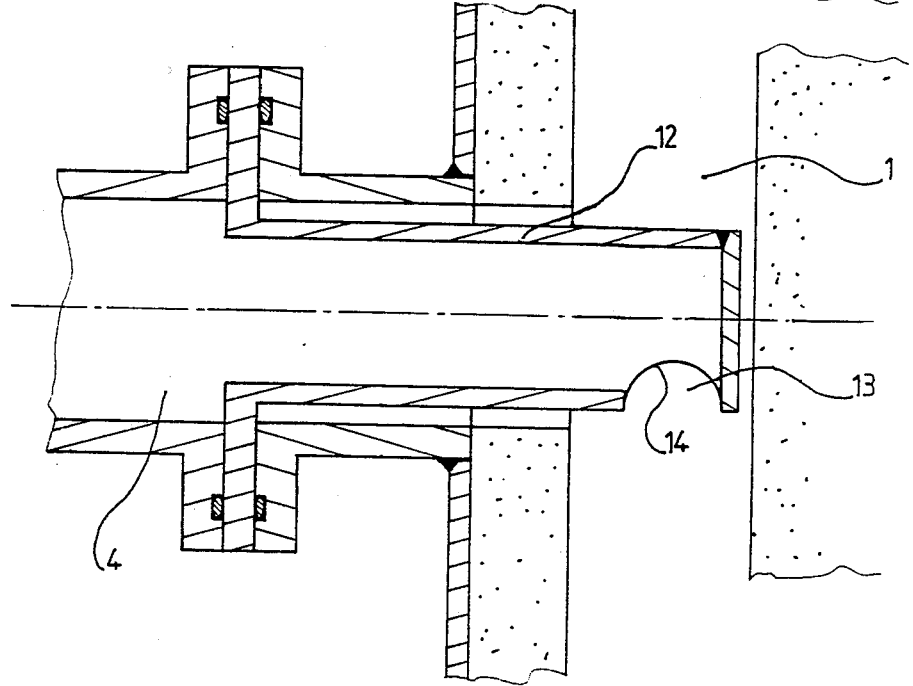

ROTARY JOINT DEVICE FOR A CRYOGENIC LIQUID

BACKGROUND OF THE INVENTION

The present invention relates generally to and has essentially for its subject matter a device forming a rotary or swivel joint for a cryogenic liquid in particular applicable for the transfer of liquefied natural gas for instance off-shore at sea.

Devices forming rotary or swivel joints for a cryogenic fluid are already known. For instance, the French patent application No. 83.00 463 of the applicant discloses a device comprising a stationary part and a rotary part, each part carrying at least a corresponding duct suitable for the flow of cryogenic fluid through the joint. Moreover, such a device comprises fluid-tight or sealed heat insulating means for the vital portions of the joint in particular such as the portions located at the plane of junction between the stationary part and the rotary part in relation to the environmental medium. During off-shore transfer for instance, between a ship and a refinery unit on shore, some flowing portion of the cryogenic liquid undergoes a vaporization or boil-off. The gas thus evolved may not be rejected or exhausted to the open air and it is necessary to provide a duct for the return thereof.

Heretofore, to solve this problem, harbour appliances provide with two independent arms for the transfer of cryogenic liquid and for the return of the gas from the vaporized liquid have been designed. Such transfer constructions, however, are complicated and accordingly expensive.

SUMMARY OF THE INVENTION

The main object of the present invention is to provide a simple structure suitable for the transfer, in particular off-shore at sea, of cryogenic liquid in particular such as liquefied natural gas, using for instance between a ship and a refinery on shore, a single unit for mooring or fastening said ship comprising the swivel joint device. The approach provided by the present invention to solve the technical problem set consists in a swivel joint device for a cryogenic liquid such as liquefied natural gas of the kind comprising at least a corresponding central duct suitable for the flow of said cryogencic liquid through the joint, characterized in that it further comprises at least one annular duct coaxially surrounding said central duct for the return of the cold gas originating from the vaporization or boil-off of the moving liquid, said annular duct comprising gas inlet and outlet pipes, respectively, a stationary portion and a portion mounted in rotary relation to the stationary portion by means of a ball or roller bearing operating at a temperature close to ambient temperature, a double set of sealing gaskets or packings also working at a temperature close to the ambient temperature and in that there are provided firest means for the heat insulation of at least the portions of said stationary and movable walls forming said annular duct and so arranged as to prevent any cooling down through convection or radiation of said sealing gaskets or packings contacted by said cold gas. Thus such a design of the annular return of the cold gas is particularly simple and cost-saving. Moreover, the construction of the annular return is such that the sealing gaskets or packings of the joint and the ball or roller bearing operating at a temperature close to the ambient temperature may be selected among those existing already, thereby requiring no particular developmental work. This new swivel joint may thus be associated with any existing monofluid rotary joint so as to form a two-stage assembly allowing the central issue of the liquefied natural gas and the annular back-flow or return of the cold gas.

SUMMARY OF THE INVENTION

The invention will be better understood and further objects, characterizing features and advantages thereof will appear more clearly as the following explanatory description proceeds with reference to the accompanying diagrammatic drawings given by way of non-limiting examples only, illustrating several presently preferred specific embodiments of the invention and wherein:

FIG. 2A is a partial cross-sectional view showing in detail the gas inlet pipe according to the invention; and FIG. 2B is a partial cross-sectional view similar to FIG. 2A and showing another embodiment of the gas inlet pipe.

DESCRIPTION OF THE PREFERRED EMBODIMENTS

Figure 1:
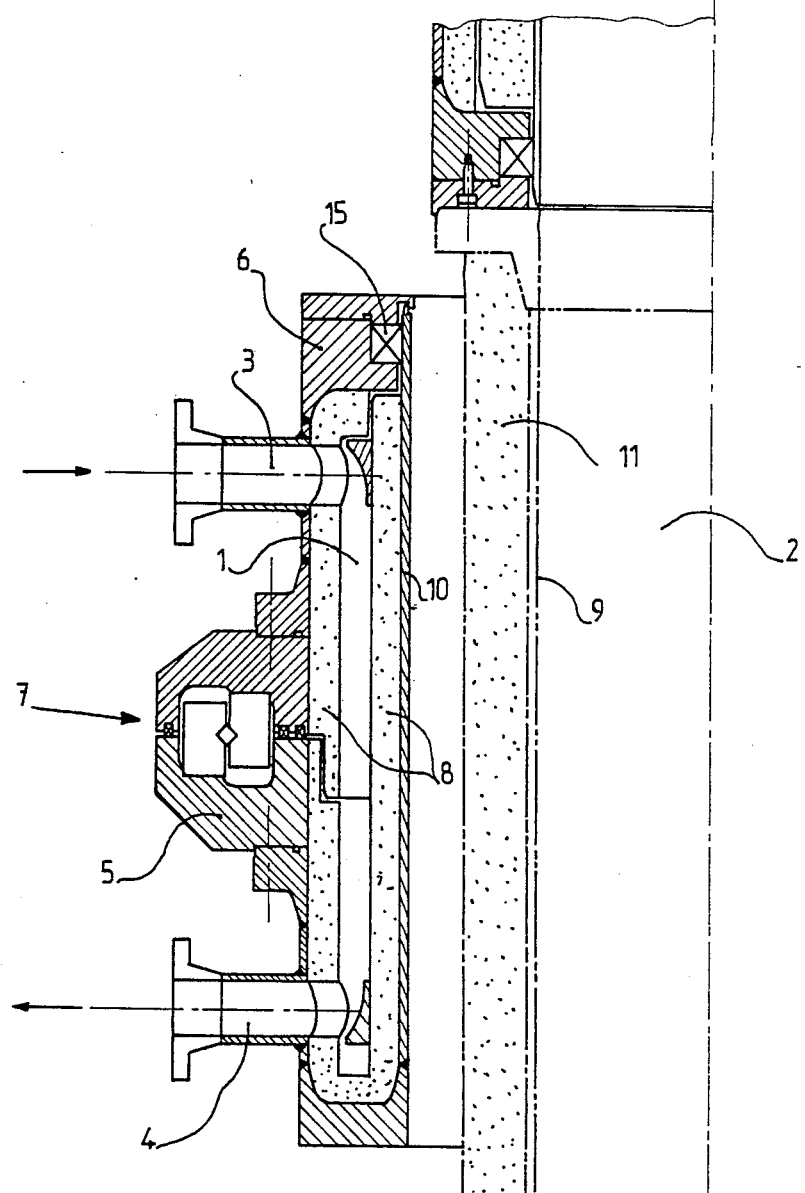
FIG. 1 is a view in half cross-section showing the swivel joint device according to the present invention.

Referring to the accompanying drawings, the device forming a swivel joint for a cryogenic liquid such as liquefied natural gas according to the present invention comprises a central duct 2 suitable for the flow of cryogenic liquid through the joint. An annular duct 1 coaxially surrounds the central duct 2. This annular duct allows the back-flow or return of cold gas originating from the vaporization or boil-off of the liquid, for instance moving liquefied natural gas. The overall fluid-tightness of the annular return or back-flow is provided by two sealing gasket or packing system and a ball or roller bearing 7 makes possible its revolving. The construction of this annular return has been chosen such that the sealing gaskets or packings and the ball or roller bearing are at a temperature close to the ambient temperature, thereby offering the advantage of retaining the state of the art for these elements.

This new swivel joint for cold gases return at a temperature for instance of $-60°$ C. to $-160°$ C. may be associated with the monofluid rotary joint such as the one described in applicant's prior French patent application No. 83.00 463 so as to form a two-stage assembly providing for the central issue of the liquefied natural gas and the annular return or back-flow of the cold gas originating from the vaporization or boil-off thereof, for instance, during its transfer. Furthermore, the annular duct 1 comprises gas inlet and outlet ducts 3 and 4, respectively, a stationary portion 5 and a portion 6 mounted in rotary relation to the stationary portion 5 by means of the roller or ball bearing 7. A heat-insulating system 8 is arranged so as to insulate at least the portions of the stationary and movable walls forming the annular duct 1 and likely to be contacted by the cold gas. Thus not only the sealing gaskets or packings and the ball or roller bearing 7 are heat-insulated, but also all those metal parts which are likely to be heat-conducting are covered or lined with the aforesaid thermal insulation system.

Moreover, between the outer wall 9 or the central duct 2 and the inner wall 10 of the annular duct 1 are also arranged heat-insulating means 11 preferably selected to be or the same nature as the aforesaid first insulating means 8.

The heat insulation system 8 is made from a rigid cellular insulating material with closed cells to avoid gas absorption such for instance as expanded poly(vinyl chloride) of high density (of about 70 to 80 kg/m$^3$) wrapped in a protective lining or cover such as glass fibre fabric or cloth. This lining is itself covered with a coating such as an elastomer with a great relative elongation in the cold state, i.e. which is not brittle in the cold condition, and preferably adhesive to allow the glass fibre fabric to be glued or stuck to the insulating material for the purpose of thus stopping the spreading out of possible cracks in the insulating material likely to build up thermal bridges.

The system of sealing gaskets or packings 15 on the stationary portion 5 is located for instance at the upper part to facilitate the access and accordingly the maintenance.

Furthermore, the stationary and movable insulations, respectively, are secured for instance by being adhesively bonded, glued or stuck to the stationary and movable portions 5 and 6, respectively.

For the purpose of insulating the metal structure of the swivel joint, in particular at the tappings and also to prevent the erosion of the insulation 8 through the contact with the cold gas flowing through the inlet and outlet pipes 3 and 4, respectively, each pipe 3, 4 comprises a preferably metallic sleeve 12 inserted in coaxial relationship therein and projecting into the annular space of the duct 1.

Moreover, to avoid the erosion of the stationary insulation 8 in front of the pipes 3 and 4 through direct impact of the gaseous jet, there is provided, in particular a metallic deflector 13 secured to the insulating material (FIG. 2A) or the sleeve. In the latter case, the aforesaid deflector 13 may be constituted by a side outlet 14 of the sleeve, the end of which is then closed (FIG. 2B).

The annular return path of the gaseous fluid which has just been described could possibly also serve as an annular passage-way for the liquid fluid (liquefied natural gas) in systems with liquid-conveying multiple passage-ways.

Moreover, such an annular return path for the gaseous fluid avoids any transmission of cold through the joint, since all the metallic parts thereof likely to conduct the cold are thermally insulated. There has also benn provided an uncrossing of the separation surfaces of the movable and stationary insulations at the ball or roller bearing 7 to avoid any transmission of cold therein.

Such a staggered arrangement of the insulation also advantageously prevents any cooling-down through convection or radiation of both sets of sealing gaskets or packings.

What is claimed is:

1. A swivel joint device for the transfer of cryogenic liquid such as liquefied natural gas particularly between an off-shore station such as a ship and a on-station such as a refinery unit and the return flow of cold gas produced by vaporization or boil-off of said cryogenic liquid, said swivel joint device comprising
    a central duct for the flow of said cryogenic liquid including a stationary central duct portion and a rotatable central duct portion, and cold gas return flow duct means,
    wherein the improvement comprises
    said cold gas return flow duct means comprising at least an annular duct portion mounted co-axially around said stationary central duct portion and including a stationary portion secured to said stationary central duct portion and a portion mounted in rotary relationship to said stationary duct portion, concentrically thereto, by means of a ball or roller bearing in a way to form therebetween said annular duct, and additionally comprising means for retaining said ball or roller bearing together,
    said annular duct including inner walls and comprising inlet and outlet means for the flow of said cold gas through said annular duct provided respectively in said rotatable and stationary duct portions,
    the entire face of said inner walls of the stationary and rotatable annular duct portions being covered by first heat-insulating means,
    said stationary and rotatable annular duct portions having cylindrical outer surfaces which are axially aligned and said ball or roller bearing comprising two portions secured respectively to said cylindrical outer surfaces of said stationary and rotatable annular duct portions, so as to be heat-insulated from said coal gas flowing through said annular duct by said first heat-insulating means and to operate at a temperature close to ambient temperature, and
    sealing gaskets being provided between said stationary and rotatable duct portions at locations heat-insulated from said cold gas flowing through said annular duct by said first heat-insulating means in a way to operate substantially at a temperature close to the ambient temperature.

2. A device according to claim 1 characterized in that there is provided between an outer wall of said central duct and the inner wall of said annular duct second heat-insulating means.

3. A device according to claim 2 wherein said second heat insulating means are of the same nature as said first insulating means.

4. A device according to claim 1, characterized in that said first heat-insulating means are made from a rigid cellular insulating material with closed cells wrapped in a protective lining covered with a bonding coating.

5. A device according to claim 4 wherein said rigid cellular insulating material with closed cells is formed of high-density expanded polyvinyl chloride.

6. A device according to claim 4 wherein said protective lining is formed of a glass fiber fabric.

7. A device according to claim 4 wherein said bonding coating is adhesively secured to said protective lining.

8. A device according to claim 1, wherein each of said cold gas inlet and outlet means comprise pipe means each including a metallic sleeve coaxially mounted in said pipe means with a radial clearance between said sleeve and said pipe means and projecting into said annular duct.

9. A device according to claim 8, wherein at each aforesaid pipe means are provided deflecting means for the ingoing or outgoing gas.

10. A device according to claim 9, wherein said deflecting means are secured to said sleeve.

11. A device according to claim 9, wherein said deflecting means are secured to said first insulating means.

12. A device according to claim 9, wherein said deflecting means are metallic.

13. A device according to claim 9, wherein said sleeve is closed at an end portion projecting into said annular duct and comprises a side or lateral outlet constituting said deflecting means.

14. A device according to claim 9, characterized in that said deflecting means are constituted by at least one side outlet of said sleeve, the end of which is then closed.

* * * * *

UNITED STATES PATENT AND TRADEMARK OFFICE
CERTIFICATE OF CORRECTION

PATENT NO. : 4,844,514
DATED : July 4, 1989
INVENTOR(S) : Jean-Michel CHAUVIN, et al.

It is certified that error appears in the above—identified patent and that said Letters Patent is hereby corrected as shown below:

ON TITLE PAGE:

(75) Inventors: Jean-Michel Chauvin, Marly Le Roi;
Jean-Pierre R.F. Ghilardi,
Montilignon, both of France

(73) (assignee): Entreprise D'Equipements Mecaniques
et Hydrauliques E.M.H., France Signed and Sealed this Twenty-fifth Day of February, 1992

Attest:

HARRY F. MANBECK, JR.

*Attesting Officer*  *Commissioner of Patents and Trademarks*